US007802099B2

(12) United States Patent
Mitchell et al.

(10) Patent No.: US 7,802,099 B2
(45) Date of Patent: *Sep. 21, 2010

(54) METHOD AND APPARATUS FOR ESTABLISHING A SECURE CONNECTION

(75) Inventors: Douglas P. Mitchell, Lake Forest Park, WA (US); John C. Hurley, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 359 days.

This patent is subject to a terminal disclaimer.

(21) Appl. No.: 11/542,573

(22) Filed: Oct. 3, 2006

(65) Prior Publication Data

US 2007/0050625 A1 Mar. 1, 2007

Related U.S. Application Data

(63) Continuation of application No. 11/159,956, filed on Jun. 22, 2005.

(51) Int. Cl.
*H04L 9/32* (2006.01)
(52) U.S. Cl. .................. 713/175; 713/156; 713/173
(58) Field of Classification Search ............... None
See application file for complete search history.

(56) References Cited

U.S. PATENT DOCUMENTS 6,615,348 B1 * 9/2003 Gibbs ................ 713/162
6,807,566 B1   10/2004 Bates et al. ............. 709/206
2002/0147766 A1 * 10/2002 Vanska et al. ............ 709/203
2002/0178356 A1 * 11/2002 Mattila .................. 713/156
2003/0084138 A1 *  5/2003 Tavis et al. .............. 709/223
2003/0188156 A1 * 10/2003 Yasala et al. ............. 713/156
2004/0078565 A1 *  4/2004 Hofmeister et al. ....... 713/156
2004/0152464 A1    8/2004 Sugaya ................ 455/435.1
2005/0038756 A1 *  2/2005 Nagel ..................... 705/76
2005/0266798 A1 * 12/2005 Moloney et al. ......... 455/41.2
2006/0104450 A1 *  5/2006 Tresser ................... 380/285
2006/0230272 A1 * 10/2006 Lawrence et al. ........ 713/176
2006/0242405 A1 * 10/2006 Gupta et al. ............. 713/156

OTHER PUBLICATIONS

Apple Certificate, Key, and Trust Services Programming Guide Jun. 28, 2004.*

* cited by examiner

*Primary Examiner*—Matthew B Smithers
*Assistant Examiner*—David J Pearson
(74) *Attorney, Agent, or Firm*—Park, Vaughan & Fleming LLP (57) ABSTRACT

One embodiment of the present invention provides a system that establishes a secure connection with a peer. During operation, the system obtains an identity for the peer. Next, the system looks up the identity for the peer in a local store, which contains identities for trusted peers. If this lookup fails, the system asks a user if the peer can be trusted. If the user indicates that the peer can be trusted, the system establishes a secure connection with the peer.

16 Claims, 5 Drawing Sheets

METHOD AND APPARATUS FOR ESTABLISHING A SECURE CONNECTION

RELATED APPLICATION

This application is a continuation of pending U.S. patent application Ser. No. 11/159,956, filed 22 Jun. 2005. This application hereby claims priority under 35 U.S.C. §120 to the above-listed application.

BACKGROUND

1. Field of the Invention

The present invention generally relates to computer security. More specifically, the present invention relates to a method and an apparatus that facilitates establishing a secure connection on a communication channel.

2. Related Art

The TLS protocol is widely used to provide security on communication channels. The term "security" in this context refers to the fact that the TLS protocol provides both privacy and authentication. Privacy is provided by encryption of the communication channel, so that eavesdroppers cannot decipher the data that is flowing through the communication channel. Authentication is provided through public key cryptography, which allows a participant in a secured communication to be reasonably sure that they are in fact talking to who they think they are talking to. For example, public key cryptography can be used to ensure that if you think you're giving your credit card number to amazon.com, you in fact are securely communicating with amazon.com and not with an impostor.

Although the TLS protocol, is widely used (for example, every web browser has an implementation of client-side TLS, or at least of TLS's predecessor, SSL), TLS is rather cumbersome to administer for servers. A significant administrative difficulty arises from certificate management. Normally, TLS servers have a certificate which is signed by a Certificate Authority (CA) such as Verisign™. TLS clients, such as web browsers, contain a built-in list of CAs which they trust. Hence, if a TLS server wants to be recognized as trustworthy by such a client, the server must first obtain a digital certificate (such as an X.509 certificate) from one of the widely-known CAs. This process of obtaining a digital certificate from a widely-known CA is not a trivial matter; it takes time, paperwork, and money.

Hence, what is needed is a method and an apparatus for establishing a secure connection without the above-described difficulties involved in managing digital certificates.

SUMMARY

One embodiment of the present invention provides a system that establishes a secure connection with a peer. During operation, the system obtains an identity for the peer. Next, the system looks up the identity for the peer in a local store, which contains identities for trusted peers. If this lookup fails, the system asks a user if the peer can be trusted. If the user indicates that the peer can be trusted, the system establishes a secure connection with the peer. (Note that the term "peer" as used in this specification and in the appended claims refers to any type of computational device or system that can interact with other computational devices or systems. For example, a peer can be a client or a server in a client-server system, or can be a peer in a peer-to-peer system.)

In a variation on this embodiment, the identity for the peer can be represented by a digital certificate for the peer.

In a further variation, establishing the secure connection with the peer involves: starting with an unauthenticated connection with the peer; importing the digital certificate for the peer into the local store; and then establishing the secure connection with the peer using the unauthenticated connection and the digital certificate for the peer.

In a further variation, if the digital certificate for the peer is a self-signed digital certificate, the method further comprises performing an out-of-band exchange with the peer to confirm the validity of the self-signed digital certificate.

In a variation on this embodiment, obtaining the identity for the peer involves performing a service discovery operation to obtain the identity for the peer and also to obtain an unauthenticated connection with the peer.

In a variation on this embodiment, the secure connection is a Secure Sockets Layer (SSL) connection or a Transport Layer Security (TLS) connection.

In a variation on this embodiment, the local store is a Mac OS™ keychain.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN, or the Internet.

Distributed System

Figure 1:
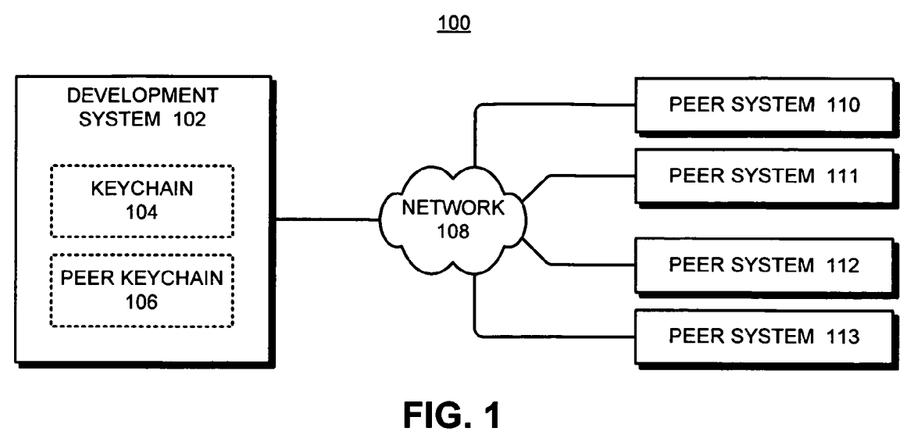
FIG. 1 illustrates a distributed system in accordance with an embodiment of the present invention.

FIG. 1 illustrates a distributed system 100 in accordance with an embodiment of the present invention. Distributed computer system 100 includes a development system 102 and a number of peer systems 110-113, which are coupled together by a network 108. Network 108 can generally include any type of wired or wireless communication channel capable of coupling together computing nodes. This includes, but is not limited to, a local area network, a wide area network, or a combination of networks. In one embodiment of the present invention, network 108 includes the Internet.

Development system 102 supports a number of software development tools. During the software development process, development system 102 makes use of peer systems 110-113 to perform computational operations related to code development. For example, development system 102 can off-load compilation operations to peer systems 110-113. Note that the present invention is not meant to be limited to software development systems. In general, the present invention can be applied to any computational devices or systems that collaborate with each other.

To facilitate secure communications with peer systems 110-113, development system includes keychains 104 and 106. Keychain 104 includes digital certificates which belong to development system 102, whereas peer keychain 106 includes digital certificates belonging to peers that development system 102 can trust. In one embodiment of the present invention, keychains 104 and 106 are keychains as defined within the Mac OS X™ operating system.

Certificate Creation and Distribution

Figure 2:
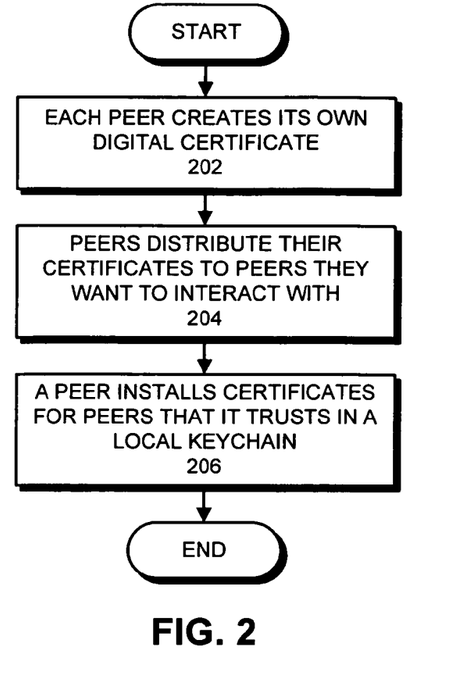
FIG. 2 presents a flow chart illustrating the certificate creation and distribution process in accordance with an embodiment of the present invention.

FIG. 2 presents a flow chart illustrating the process of creating and distributing digital certificates in accordance with an embodiment of the present invention. During this process, each peer creates its own digital certificate (step 202). This certificate creation operation can be accomplished by calling a function, which is described in more detail below. Next, peers distribute their certificates to other peers that they want to interact with (step 204). When a peer receives a certificate for a peer that it trusts, the receiving peer installs the certificate in its local peer keychain (step 206).

Establishing a Secure Connection

Figure 3:
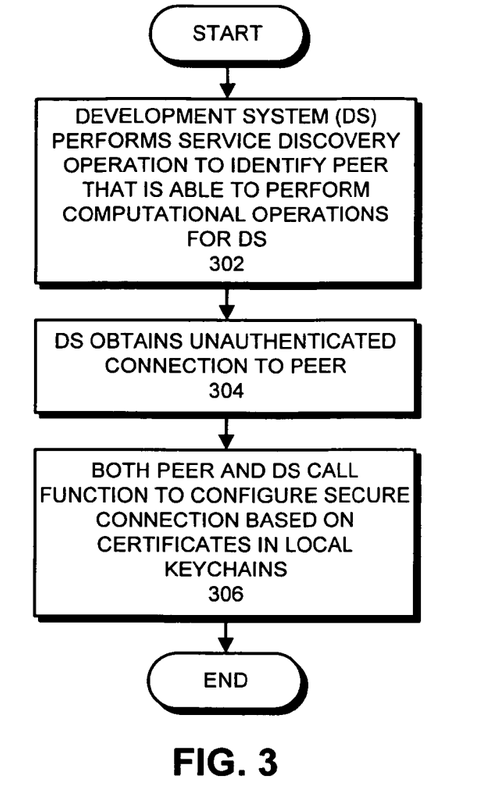
FIG. 3 presents a flow chart illustrating the process of identifying a peer and establishing a secure connection with the peer in accordance with an embodiment of the present invention.

FIG. 3 presents a flow chart illustrating the process of identifying a peer and establishing a secure connection with the peer in accordance with an embodiment of the present invention. The process starts when development system 102 performs a service discovery operation to identify a peer system 110 that is able to perform a service, such as performing compilation operations for development system 102 (step 302).

During this discovery process, development system 102 obtains an unauthenticated connection to peer system 110 (step 304). At this point, both peer system 110 and development system 102 call a function to configure a secure connection between development system 102 and peer system 110. This function uses digital certificates from associated keychains and is described in more detail below.

Figure 4:
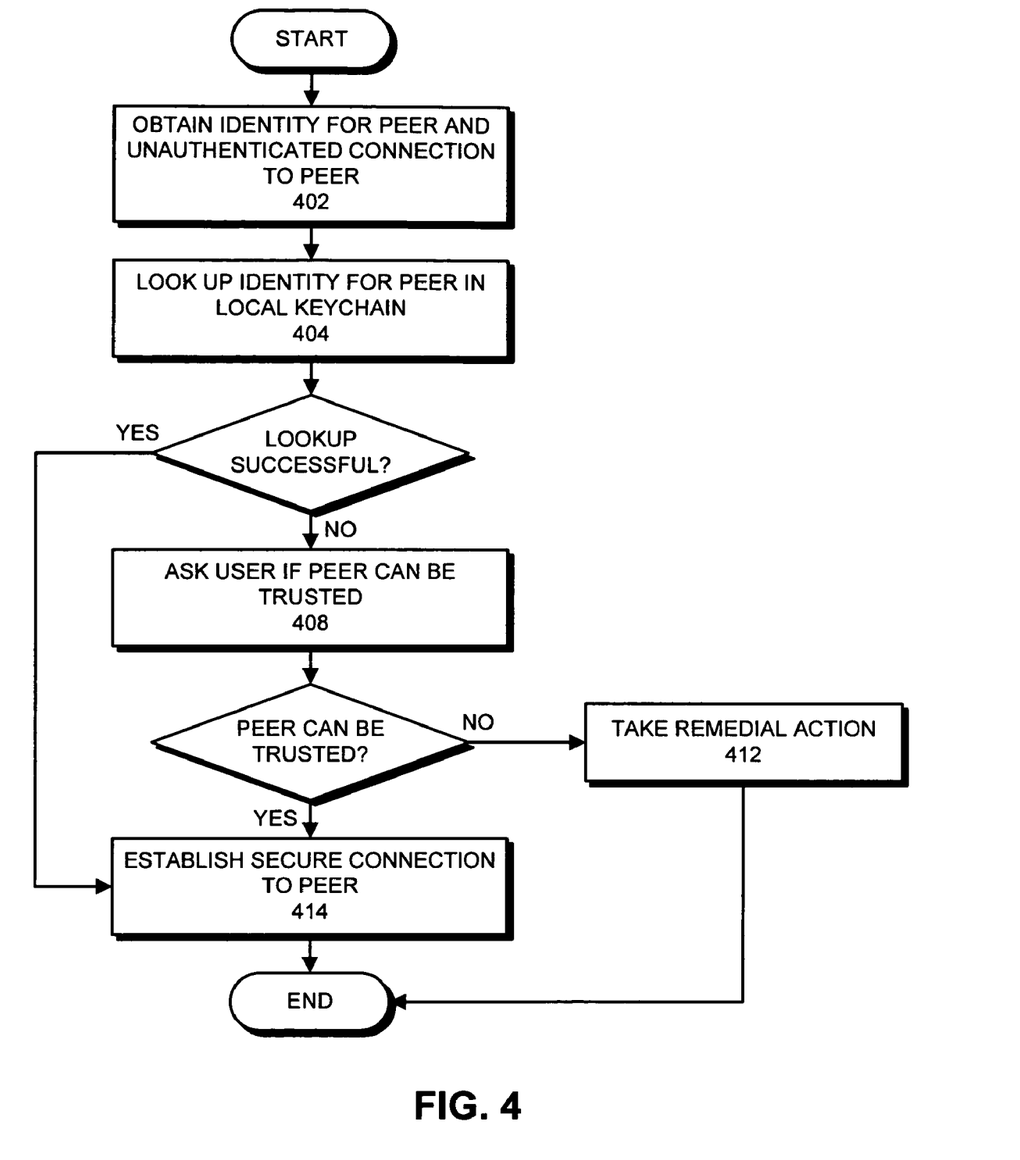
FIG. 4 presents a flow chart illustrating how a secure connection is established in accordance with an embodiment of the present invention.

The process of setting up a secure connection generally involves the following steps which are illustrated in the flow chart that appears in FIG. 4. First, a computer system, such as development system 102, obtains an identity for a peer and an unauthenticated connection to the peer (step 402).

Next, the system looks up the identity of the peer in a local keychain, which contains identities for peers (represented by digital certificates) that the system has decided to trust (step 404). If this lookup is successful, the system establishes the secure connection to the peer using a corresponding certificate for the peer from the local keychain (step 414).

On the other hand, if the lookup in step 404 is not successful, the system asks a user if the peer can be trusted (step 408). If the user answers "no," the system takes a remedial action (step 412). Otherwise, if the user answers "yes," the system establishes the secure connection to the peer (step 414). This may involve first obtaining and importing a certificate for the peer into a local keychain.

The above-described processes are described in more detail below.

Secure Collaboration

It is often desirable to enable secure, ad-hoc collaboration amongst multiple people. A number of service discovery mechanisms exist, such Bonjour™, which can be used to establish connections for these ad-hoc collaborations. However, the techniques described below can also be applied to connections established through other means.

Secure sessions can be established through the use of a mutual shared secret, such as a password. However, users are not particularly good at choosing passwords. While this may not matter so much in a one-time ad-hoc situation, it means that this process must be repeated each time these users meet. In addition, the key distribution problem is already difficult in a small meeting where, say, a third of the attendees will participate. Finally, this requires user interaction, which we can avoid in most cases.

Digital certificates offer a compelling solution to this problem. Through the use of digital certificates, it is possible to make this collaboration secure, and completely transparent in most cases. The reason that digital certificates are not more widely used is because many users must have them to make effective use of them. This will change rapidly as certificates are issued to more users.

Exemplary Embodiment

One embodiment of the present invention performs a number of different operations: service discovery, identity selection, trust decisions, and data transfer. For service discovery operations, Bonjour™ can be used because it is convenient, and also because it is ideal for ad hoc collaboration. Data transfer operations can be accomplished using any convenient technique. In one embodiment of the present invention, data transfer operations are performed through sockets as is discussed below. Identity and trust are also discussed below.

One embodiment of the present invention provides a client/server application that publishes and discovers availability through Bonjour™, and which authenticates using digital certificates.

Figure 5:
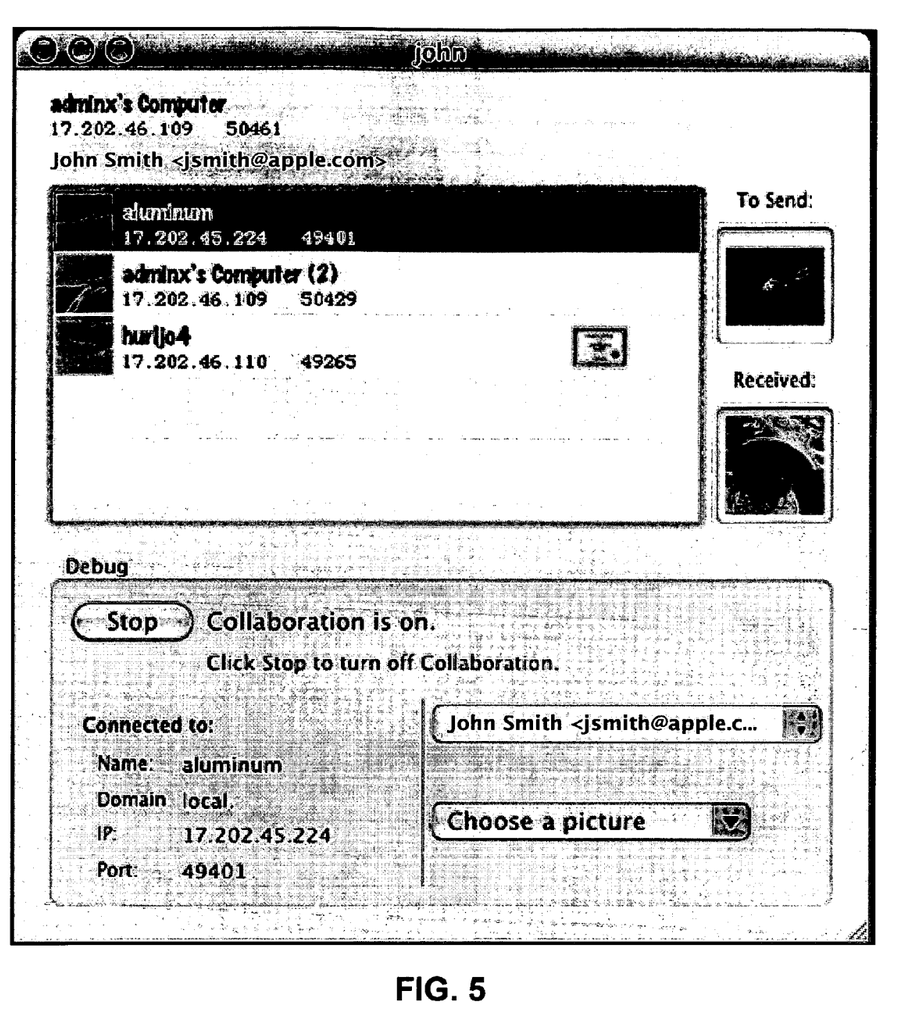
FIG. 5 illustrates an exemplary user interface to facilitate collaboration in accordance with an embodiment of the present invention.

An exemplary user interface for this application appears in FIG. 5. In the screenshot of the main window list in FIG. 5, the list box contains a list of "servers" that will send a picture to the client if clicked on. The certificate shown next to "hurljo4" indicates that the system has received a certificate from that "server." The information above the list box is the information for this "server." In FIG. 5, the items contained in the "Debug" box can be considered as advanced features or informational only. These items provide more detail about the server which is highlighted in the main window list. Note that the items in the list box are exemplary items and can in practice have different information than is shown in FIG. 5.

Figure 6:
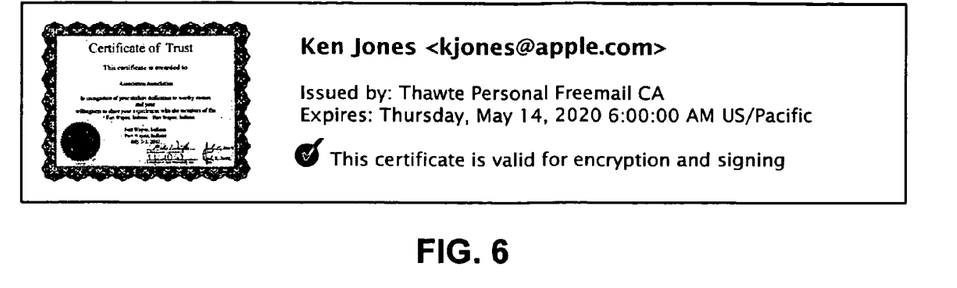
FIG. 6 illustrates a representation of a digital certificate in accordance with an embodiment of the present invention.

The simplified view of a certificate illustrated in FIG. 6 shows most of the essential information in a very compact form, and makes it easy for the user to do their own quick assessment of whether to trust it or not. Note that although this certificate may validate successfully, it might not be the particular "Ken Jones" that the user wants to communicate with.

Identity Search

In one embodiment of the present invention an identity is defined to be a public/private key pair that satisfies certain properties. In general, the present invention can use any identity that supports client authentication. A trust policy can be defined to focus the search and to verify that the identity is valid for this purpose. In the case where the user does not have any identity, the system can generate a self-signed certificate.

In one embodiment of the present invention, all of the user keychains are searched for identities that could be used for collaboration. The located identities are then displayed in the popup menu shown below. The ability to select a specific identity to use for collaboration can possibly be available in a preferences pane somewhere, but in general we can just pick the "best" identity for the user and use that for collaboration. Note that this approach allows the system to use any identity which satisfies the "collaboration" trust policy. This can include:

Certificates issued by a company for its customers;
Certificates issued by a Certificate Authority;
Certificates on a smart card; and
Self-signed certificates.

In many or most cases, the system can select one of these automatically to avoid user interaction. The only case that demands some user interaction is the self-signed certificate.

Certificate Transport

The first time a collaboration is initiated, the public certificates of the participants need to be exchanged. This can be done as part of the SSL/TLS exchange. Technically, this can involve a call toSSLGetPeerCertificates after the call to SSL-Handshake. These certificates can then be added to the user's keychain for use in future collaboration sessions.

Trust Issues

For certificates signed by a trusted certificate authority (i.e. one whose root is in the system root certificate database), trust can be established quickly by seeing if the name is as expected (e.g. I'm talking with Sam so sam@mac.com is good). For self-signed certificates, a one-time out-of-band exchange needs to happen. This can involve using pair of words selected from a dictionary based on some component of the SHA-1 hash can be shown to the user and confirmed verbally.

After the user has accepted the certificate (mechanism unspecified), it can be shown the next time without the warning badge.

Certificate Properties

A certificate associated with an identity which is used in this scheme can have certain properties. One of the most important properties is key usage. Some possible values for id-ce-keyUsage are:

---
digitalSignature, nonRepudiation, keyEncipherment, keyAgreement, keyCertSign, cRLSign, encipherOnly, and decipherOnly.
---

The extended key usage fields may also be interesting: id-kp-serverAuth and id-kp-clientAuth.

Other fields may be set, but at least one of digital Signature, keyEncipherment, keyAgreement should be present.

For a definition of these fields, see RFC 2459, Internet X.509 Public Key Infrastructure Certificate and CRL Profile, IETF, January 1999, at http://www.ietf.org/rfc/rfc2459.txt.

Configuring and Using the System

To use the system, a user must be associated with an identity of some type in one of the user's keychains. If the user does not have such an identity, the user can obtain one by making a call to one of the functions described below.

SecBonjour Library

The above-described system operates by making calls to a special library of functions, called the "SecBonjour" library, which provides security on a communication channel. The SecBonjour library does not require any heavyweight (e.g. enterprise-wide or larger) administration, but is instead administered by users of individual machines. The degree of security of a given communication channel can vary, and is solely determined by configuration performed by the users of the machine(s) which are involved in the communication.

The SecBonjour library relies on Transport Layer Security (TLS) to secure a communication channel. TLS provides a secure channel between a server (e.g. a web server) and a client (e.g., a web browser). An important aspect of SecBonjour, which enables administration and configuration in a Bonjour-style manner is that the entire subject of Certificate Authorities can be bypassed, making the user of each machine a CA if they so desire.

The SecBonjour library provides one simple function which, when called, installs a TLS server certificate in the user's keychain, and also provides a copy of the certificate which the user then distributes through normal, insecure channels (email, etc.) to other SecBonjour users. Other users then, at their own discretion, import this certificate into their own keychains (either with the Keychain Access app, or via a simple C function). For example, Alice creates her certificate and gives a copy of the certificate to Bob, who then imports Alice's certificate into his own keychain. Bob can then initiate secure communication with Alice, with certainty that it is Alice at the other end of the pipe/socket/whatever. The authentication can go both ways, so that Bob can create his certificate and give it to Alice, who imports that certificate into her keychain. In this case, a communication channel can be created in which both Alice and Bob are certain of the identity of the entity at the other end of the channel.

The degree of authentication for a given channel is flexible and is determined by configuration options performed at both ends of the channel, as well as by the distribution of certificates. Users in a very trusting environment who do not wish to perform any authentication don't have to create or distribute certificates; they can create unauthenticated (but encrypted) communication channels. (Please note that such a communication channel, while encrypted, actually provides very little of what is widely considered to be "Security," since neither entity has any idea of who they are talking to. The entities could be talking to a hostile entity who is for example trying to coax them into giving out their password.) Individual devices can provide certificates, without requiring certificates from clients which use the device. Individual devices and clients can require two-way authentication, rejecting connections which do not meet this criteria.

Given a current state of certificates and user preferences, establishing a secure connection between a client and a server (or in Bonjour lingo, a client and a device) involves calling a single function in the SecBonjour library. This function is called after a basic (insecure) socket-level connection has been established between the client and the server. Subsequent communications over the secure channel are performed by simple read and write calls.

One embodiment of the SecBonjour library provides three high-level functions. One of these functions, SR_CertificateAndKeyCreate ( ), is used to create a private key and a certificate for a given node. (We refer to both the server and the client as SecBonjour nodes.) This function is called by the administrator of a specific device if clients of that device wish to authenticate the device when they establish a connection to it.

```
OSStatus SR_CertificateAndKeyCreate(
    CFStringRef hostName,
    CFStringRef userName,
    SecKeychainRef keychain,
    CFDataRef *cert); // RETURNED
``` where,
- hostname is the name of host on which this certificate will be used. It is the same as the name by which clients will connect to the host—e.g., "crypto.apple.com." This string must be convertible to an ASCII C string. In the spirit of Bonjour-style local configuration, this can be something as generic as "localhost" (if all of the nodes which will be using this certificate reside on the same host), or a link-local name like "tower.local."
- username is strictly for human readability. It can denote the same of the device associated with the certificate ("Doug's Laser Printer"), a user ("Derek"), or anything else. This string must be convertible to an ASCII C string.
- keychain is a reference to an open keychain, to which the created certificate and private key will be written.
- cert is a copy of the created certificate. This certificate, which is about 500 bytes of binary data, is typically distributed to other SecBonjour users, who import the certificate into their own keychains via SR_CertificateImport( ). This certificate is not sensitive; it can be carried about freely, sent via email, etc. The actual implications of another user actually importing this certificate into their own keychain are discussed in the section entitled "Security Considerations".

The SR_CertificateImport( ) function is used to import certificates created by other users. These certificates are created by SR_CertificateAndKeyCreate( ). Generally, when a user performs this operation, they are indicating that they wish to implicitly trust the owner of the certificate being imported.

```
OSStatus SR_CertificateImport(
    SecKeychainRef keychain,
    CFDataRef cert);
``` where,
- keychain is a reference to an open keychain, to which the imported certificate will be written.
- cert is the certificate created by SR_CertificateAndKeyCreate( ).

The SR_SecureTransportConfigure( ) function is used to establish a secure TLS channel. It is called after basic a socket-level connection has been established. The same function is used on the server side and the client side of a connection. On return from this function, a secure communication channel exists, and secure communication can be performed with the peer using the SSLRead( ) and SSLWrite( ) functions (declared in <Security/SecureTransport.h>).

When the application is finished using the channel, it can call SSLClose ( ) to flush any remaining buffered I/O, and then call SSLDisposeContext( ) to free up the SSLContextRef.

```
OSStatus SR_SecureTransportConfigure( int sock,
    CFStringRef peerHostName, bool isServer, bool
    requirePeerAuthentication, SecKeychainRef
    myCertKeychain, SecKeychainRef
    peerCertKeychain, SSLContextRef *sslContext);
    // RETURNED
``` where
- sock is a UNIX socket representing a connection to a peer. If this is a server, accept ( ) has already been called. If this is a client, connect( ) has already been called.
- peerHostName is the name of the peer host, e.g., "crypto.apple.com". Specifying this is optional; if you don't know the peer's host name, pass in NULL. (Doing so is actually quite common on the server side, where it is cumbersome or impossible to know the host name of the client.) Specifying a non-NULL host name provides additional authentication by requiring that the peer's certificate is indeed from the specified host name. If specified, this must match exactly the name in the peer's certificate, as provided in the hostname argument when SR_CertificateAndKeyCreate( ) was called is Server determines if this is a client or a server node.
- requirePeerAuthentication: Setting this to true means that the peer must present a certificate which we recognize by its presence in peerCertKeychain.
- myCertKeychain optionally specifies the location of this node's certificate. If not specified, the peer must be willing to accept an unauthenticated connection. Caller must hold a reference to the keychain throughout the TLS session.
- peerCertKeychain: Optionally specifies a keychain containing certificates of trusted peers; required if requirePeerAuthentication true, else optional. Caller must hold a reference to the keychain throughout the TLS session.

Authentication Options

Administrators of individual SecBonjour nodes have a good deal of flexibility in specifying the degree of authentication which can be, or must be, performed when their node is involved in SecBonjour communication. For the purposes of this library, this degree of authentication is determined by the arguments to SR_SecureTransportConfigure( ) and by the contents of the keychains provided to that function, if any. Authentication is performed via TLS, so a brief discussion of the options available in TLS is in order. TLS provides three styles of authentication.
- no authentication—No certificates are involved, and no assurance as to the identity of the peer is provided.
- server-side authentication (only)—In this style, a client can be assured of the identity of a server, and the server is willing to provide its service promiscuously. Most TLS-enabled web servers operate in this manner. The server has a certificate which is verifiable by the client. The main purpose of this style of authentication is to assure a client that sensitive information she is providing over the channel (password, credit card number) is only being seen by the server which is the actual intended recipient of the data. Note that this sensitive information can, and often is, used by the server to identify and authenticate the client using means outside the scope of TLS.

server-side and client-side authentication—Both sides have a certificate which is verifiable by the other side.

Note that TLS does not allow client-side authentication without server-side authentication.

Per the Bonjour paradigm, authentication can be administered locally, by the owners of the machines or services involved. The actual form of authentication to be used in a given TLS session is negotiated during the establishment of a session; the familiar "best thing that both parties agree they can do" is negotiated. Both nodes can effectively specify minimum and maximum levels of authentication they are willing and able to do, and each node can, by the presence of other nodes' certificates in the keychain passed to SR_SecureTransportConfigure( ), restrict connections to only nodes authorized by the administrator (i.e., the owner of the keychain).

Here is a description of the arguments to SR_SecureTransportConfigure( ) which determine what style of authentication is performed between two specified nodes, with descriptions of the relation of these variables to the actual negotiated authentication.

myCertKeychain contains this node's certificate and private key. If either of those are absent, or myCertKeychain is NULL, this node can not be authenticated by the peer.

peerCertKeychain contains the certificates of peers one is willing to accept authenticated connections to. If this keychain is empty, or peerCertKeychain is NULL, peers can not be authenticated.

requirePeerAuthentication indicates whether this node requires peers to be authenticated. Specifying a value of true for this, while specifying a NULL or empty peerCertKeychain, is illegal. Specifying a true value for this, while the peer node has not provided a peerCertKeychain, will result in negotiation failure.

Note that myCertKeychain and peerCertKeychain can be identical.

Also, note that the only way for a full server- and client-side authentication to be successfully performed is for both server and client to provide valid myCertKeychain arguments when they each call SecureTransportConfigure( ), and for both nodes to have copies of the other node's certificate in the peerCertChain argument to SecureTransportConfigure( ).

If the criteria specified in the previous bullet item are not met, and either node specifies a value of true for requirePeerAuthentication, the negotiation will fail.

There is a non-obvious failure mode which must be recognized and potentially handled by clients. Suppose node 1, a server, has both kinds of keychains—its private key and certificate in node1CertKeychain, and a set of peer certificates in node1PeerCertKeychain. Also, suppose node2 is similarly configured, with node2CertKeychain and node2PeerCertKeychain.

But suppose that node 1's own certificate is not contained in node2's node2PeerCertKeychain. Now a SecBonjour is attempted between these two nodes, with node2 as the client, with both nodes specifying false for requirePeerAuthentication. This connection attempt will fail, because node2 is configured to attempt to authenticate node1 (due to the presence of valid certificates in node2PeerCertKeychain), but there is no certificate for node in node2's peerCertKeychain. Hence, Node2's call to SR_SecureTransportConfigure will return errSSLUnknownRootCert.

The application must detect this and perhaps retry the connection, specifying a NULL value for peerCertKeychain (indicating that it is not interested in even attempting to perform peer authentication). If and only if node1 is configured with requirePeerAuthentication false, this subsequent connection attempt will succeed.

Example Programs

Two example programs are provided with SecBonjour. One, srCertTool, illustrates the administration of certificates. The other, srTlsNode, illustrates the establishment and use of a secure connection.

srCertTool

This program is a command line tool which illustrates the use of the two SecBonjour certificate-related functions: SR_CertificateAndKeyCreate and SR_CertificateAndImport. It has two options: one to create a certificate, and one to import an existing certificate.

Creating a certificate and a private key is performed like this:

```
% srCertTool create <hostname> <username> <keychain>
    <certflie>
```

This results in a private key and certificate being created with the specified hostname and username, and the certificate is added to the specified keychain. The resulting certificate, which is typically given out to other SecBonjour users, is written to the file specified by certfile. The specified keychain must already exist.

To import an existing certificate into a keychain, do this:

```
% srCertTool import <keychain> <certfile>
```

Suppose two nodes wish to be able to establish a fully authenticated channel (in which both the server and the client are authenticated). Both nodes must create a cert and give that cert to the other node, which imports that cert into their keychain. Say the first node is at hostname "host1.local.", its own certificate is to be kept in node1Cert.kc, and its peer certificates are to be kept in node1PeerCert.kc. Similarly, the second node has values of "host2.local", node2Cert.kc, and node2PeerCert.kc.

First node1 does this:

```
% srCertTool create host1.local. node1 node1Cert.kc
    node1Cert.cer
```

While node2 does this:

```
% srCertTool create host2.local. node2 node2Cert.kc
    node2Cert.cer
```

Then the two entities (or their administrators) exchange the resulting certificate files, and these two steps are performed:

```
% srCertTool import node1PeerCerts.kc node2Cert.cer
% srCertTool import node2PeerCerts.kc node1Cert.cer
```

At this point, both nodes have the necessary certificates and keychains needed to authenticate each other using SecBonjour.

srTlsNode

This program is a command line tool behaves as either a server or a client. It illustrates the use of the SR_SecureTransportConfigure( ) function. Its usage is as follows:

```
srTlsNode s[erver]|c[lient] [options]
Options:
    -h hostname (default=localhost)
    -p port (default = 1200)
    -m myCertKeychain
    -p peerCertKeychain
    -r[equirePeerAuthentication]
    -n (don't use hostname for authentication)
```

These options map directly to the arguments to the SecureTransportConfigure( ) function. The '-n' option is typically used in the server case, when the host name of the client is not known when srTlsNode is run (note that this is actually a common situation for servers in the real world.) When this option is specified, a NULL is passed as peerHostName in the call to SR_SecureTransportConfigure( ).

To illustrate the use of this program, assume that node1 and node2 have set up their keychains as described in the previous example, and that node1 is to be a server, and node2 is to be a client.

First run srTlsNode as a server for node1, and see the following output:

```
% srTlsNode server -h host2.local. -m node1Cert.kc -
p node1PeerCerts.kc ...listening for client
connection on port 1200
```

Then run srTlsNode as a client for node2, and see the following output:

```
% srTlsNode client -h host1.local. -m node2Cert.kc -p
node2PeerCerts.kc
...connecting to host host1.local. at port 1200
...establishing secure TLS connection
...Authenticated (RSA) connection established
...client authentication successfully performed
Type some text to send to server, terminated by CR. A
line starting with 'Q' terminates the session.
```

After which the srTlsNode running at node1 will display the following:

```
...establishing secure TLS connection
...Authenticated (RSA) connection established
...client authentication successfully performed
...waiting for data from client
```

At this point, text that you enter at the node2 client will be securely sent to node1 and displayed there; then you can type in text at node1 to send it to and be displayed at node2. Either node ends the session by entering 'Q'. There is a csh script which performs a simplified version of the four separate runs of srCertTool described above. This script, in scripts/make-LocalCerts, creates the four keychains described in the above examples, with the exception that hostname is "localhost" for all of the certificates. This allows the certificates to easily be used when the server and client are on the same machine.

The Trustworthiness of a Certificate

From a security perspective, one difference between a SecBonjour connection and a conventional TLS connection is in the evaluation and verification of the peer's certificate(s). Normally, a TLS server has a certificate signed by a known Certificate Authority (CA), and there is a list of known, trusted CAs maintained either by an application or by the system on the client side. SecBonjour, on the other hand, relies on the presence of root certificates in an arbitrary keychain, manipulated by the user at will. The problem with this is that the addition of a certificate into a user's keychain can be performed by any program running as that user—with no user interaction or notification. A keychain does not have to be unlocked for a rogue application to add a certificate to it—the rogue app just has to have the same UID as the owner of the keychain.

One solution to this problem of relatively insecure keychains is to store the SecBonjour certificate in the system keychain. In this scenario, someone would have to type in the admin password to add a certificate. Another, future possibility involves the specification of Access Control Lists (ACLs) along with root certificates, so that for example, only certain applications can access them. In another embodiment of the present invention, the system assigns per-user, per-certificate "trust" to individual certificates.

User Evaluation of A Certificate's Trustworthiness

Since SecBonjour does not rely on a set of system-wide trusted certificates, the trust resides in a user's keychain, and the assignment of trust is solely at the discretion of the user. It is also the sole responsibility of the user. Those familiar with the Pretty Good Privacy system (PGP) may have encountered PGP's stern warning along the lines of "Are you really sure you want to trust this public key?" The same thing pertains here: if you add a certificate to one of your keychains which will be used by SecBonjour to authenticate peers, you are responsible for determining:

a) whether you want to trust the person or service to which the certificate belongs; and b) whether the certificate you are importing actually belongs to that person or service.

The first item is self-evident, and everyone knows how to make that decision. (Do you want to allow Bob to use your printer, or not?) The second item is much harder; it is non-intuitive; it's actually the reason for the existence of the global public key infrastructure (PKI) involving hierarchies of certificates and widely-known CAs like VeriSign. Since SecBonjour deliberately bypasses the entire established PKI, the result is that the user has to make the determination as to whether, for example, this certificate I'm about to import into my SecBonjour keychain really does represent Bob's printer, or the person across the hall who wants to use my backup drive.

Before importing such a certificate into one's SecBonjour keychain, the user should ideally carefully investigate the origin of the certificate. Some examples of situations which represent dubious certainty that a certificate is what it claims to be are:
  (1) The certificate was downloaded from a web site associated with the service or user it represents.
  (2) The certificate came off a CD sitting around in the room where a printer resides.
  (3) The certificate came in an email which purports to be "From" the owner of the certificate (and of the service it represents), with no further corroboration.

Some examples of situation which give a good degree of certainty that a given certificate belongs to the service or user which it claims to represent are:
  (1) The user personally hands you a CD or USB dongle containing his certificate.
  (2) The certificate comes in an email which also contains answers to questions which you have asked, and which only the person associated with the certificate can be expected to know the answers to.
  (3) The certificate comes from a server which provides a trusted communication channel, secured outside of the SecBonjour mechanism.
  (4) The "Fingerprint" of the certificate has been published in some trustworthy manner (say, in a hard copy document the user widely distributed, or on a web site which is so widely used that it would be obvious it were being spoofed), and you verify that fingerprint using Keychain Access.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for establishing a secure connection with a peer, comprising:
  obtaining an identity for the peer, wherein a digital certificate represents the identity for the peer;
  looking up the identity for the peer in a local store, which contains identities for trusted peers; and
  when trust cannot be established based on the identity, asking a user if the peer can be trusted;
  if the user indicates that the peer can be trusted,
    causing a secure connection to be established with the peer, wherein establishing the secure connection with the peer involves:
      starting with an unauthenticated connection with the peer;
      importing the digital certificate for the peer into the local store;
      if the digital certificate for the peer is a self-signed digital certificate, performing an out-of-band exchange to confirm the validity of the self-signed digital certificate, wherein the out-of-band exchange involves:
        selecting words from a dictionary based on a secure hash algorithm (SHA) hash;
        showing the words to the user; and
        receiving an indication that the user has confirmed the words verbally; and
      establishing the secure connection with the peer using the unauthenticated connection and the digital certificate for the peer; and
  if the user indicates that the peer cannot be trusted, taking a remedial action.

2. The method of claim 1, wherein obtaining the identity for the peer involves performing a service discovery operation to obtain the identity for the peer and also to obtain an unauthenticated connection with the peer.

3. The method of claim 1, wherein the secure connection is a Secure Sockets Layer (SSL) connection or a Transport Layer Security (TLS) connection.

4. The method of claim 1, wherein the local store is an operating system keychain.

5. A non-transitory computer-readable storage medium storing instructions that when executed by a computer cause the computer to perform a method for establishing a secure connection with a peer, the method comprising:
  obtaining an identity for the peer, wherein a digital certificate represents the identity for the peer;
  looking up the identity for the peer in a local store, which contains identities for trusted peers; and
  when trust cannot be established based on the identity, asking a user if the peer can be trusted, and
  if the user indicates that the peer can be trusted,
  causing a secure connection to be established with the peer, wherein establishing the secure connection with the peer involves:
    starting with an unauthenticated connection with the peer;
    importing the digital certificate for the peer into the local store;
    if the digital certificate for the peer is a self-signed digital certificate, performing an out-of-band exchange to confirm the validity of the self-signed digital certificate, wherein the out-of-band exchange involves:
      selecting words from a dictionary based on a secure hash algorithm (SHA) hash;
      showing the words to the user; and
      receiving an indication that the user has confirmed the words verbally; and
    establishing the secure connection with the peer using the unauthenticated connection and the digital certificate for the peer; and
  if the user indicates that the peer cannot be trusted, taking a remedial action.

6. The computer-readable storage medium of claim 5, wherein obtaining the identity for the peer involves performing a service discovery operation to obtain the identity for the peer and also to obtain an unauthenticated connection with the peer.

7. The computer-readable storage medium of claim 5, wherein the secure connection is a Secure Sockets Layer (SSL) connection or a Transport Layer Security (TLS) connection.

8. The computer-readable storage medium of claim 5, wherein the local store is an operating system keychain.

9. An apparatus for establishing a secure connection with a peer, comprising:
  an identity-obtaining mechanism configured to obtain an identity for the peer, wherein the identity for the peer can be represented by a digital certificate for the peer;
  a lookup mechanism configured to look up the identity for the peer in a local store, which contains identities for trusted peers, wherein a digital certificate represents the identity for the peer; and
  when trust cannot be established based on the identity, a connection-establishing mechanism is configured to ask a user if the peer can be trusted;
  if the user indicates that the peer can be trusted, the connection-establishing mechanism is configured to establish the secure connection with the peer by:

starting with an unauthenticated connection with the peer;

importing the digital certificate for the peer into the local store;

if the digital certificate for the peer is a self-signed digital certificate, performing an out-of-band exchange to confirm the validity of the self-signed digital certificate, wherein the out-of-band exchange involves:

selecting words from a dictionary based on a secure hash algorithm (SHA) hash;

showing the words to the user; and receiving an indication that the user has confirmed the words verbally; and establishing the secure connection with the peer using the unauthenticated connection and the digital certificate for the peer; and if the user indicates that the peer cannot be trusted, the connection-establishing mechanism is configured to take a remedial action.

10. The apparatus of claim 9, wherein the identity-obtaining mechanism is configured to perform a service discovery operation to obtain the identity for the peer and also to obtain an unauthenticated connection with the peer.

11. The apparatus of claim 9, wherein the secure connection is a Secure Sockets Layer (SSL) connection or a Transport Layer Security (TLS) connection.

12. The apparatus of claim 9, wherein the local store is an operating system keychain.

13. A function library embedded on a non-transitory computer-readable storage medium, wherein the function library includes a first function for establishing a secure connection with a peer, wherein the first function is configured to:

obtain an identity for the peer, wherein a digital certificate represents the identity for the peer;

look up the identity for the peer in a local store, which contains identities for trusted peers; and when trust cannot be established based on the identity, to ask a user if the peer can be trusted, and if the user indicates that the peer can be trusted, to cause a secure connection to be established with the peer, wherein when establishing the secure connection with the peer, the first function is configured to:

start with an unauthenticated connection with the peer;

import the digital certificate for the peer into the local store;

if the digital certificate for the peer is a self-signed digital certificate, perform an out-of-band exchange to confirm the validity of the self-signed digital certificate, wherein the out-of-band exchange involves:

selecting words from a dictionary based on a secure hash algorithm hash;

showing the words to the user; and receiving an indication that the user has confirmed the words verbally; and establish the secure connection with the peer using the unauthenticated connection and the digital certificate for the peer; and if the user indicates that the peer cannot be trusted, the first function is configured to take remedial action.

14. The function library of claim 13, wherein the function library includes a second function for creating a private/public key pair and a corresponding a digital certificate for a given node.

15. The function library of claim 13, wherein the function library includes a third function for importing a digital certificate for a peer into a local store.

16. The function library of claim 13, wherein while obtaining the identity for the peer, the first function is configured to perform a service discovery operation to obtain the identity for the peer and also to obtain an unauthenticated connection with the peer.

* * * * *

UNITED STATES PATENT AND TRADEMARK OFFICE
CERTIFICATE OF CORRECTION

PATENT NO.         : 7,802,099 B2                                    Page 1 of 1
APPLICATION NO.    : 11/542573
DATED              : September 21, 2010
INVENTOR(S)        : Douglas P. Mitchell et al.

It is certified that error appears in the above-identified patent and that said Letters Patent is hereby corrected as shown below:

In column 5, line 35, delete "toSSLGetPeerCertificates" and insert -- to SSLGetPeerCertificates --, therefor.

In column 6, line 29, delete "SecBonj our" and insert -- SecBonjour --, therefor.

In column 8, line 31, delete "called is Server" and insert -- called. isServer --, therefor.

In column 10, line 26, delete "<certflie>" and insert -- <certfile> --, therefor.

In column 11, line 19, delete "-p" and insert -- -P --, therefor.

Signed and Sealed this
Twenty-ninth Day of November, 2011

David J. Kappos
*Director of the United States Patent and Trademark Office*